United States Patent Office 3,311,644
Patented Mar. 28, 1967

3,311,644
ANDROST/ESTR-4-EN-17β-YLOXYTRIALKYL-
SILANES AND CONGENERS
Edward A. Brown, Wilmette, and Ivar Laos, Skokie, Ill.,
assignors to G. D. Searle & Co., Chicago, Ill., a corporation of Delaware
No Drawing. Filed Apr. 28, 1965, Ser. No. 451,649
8 Claims. (Cl. 260—397.4)

The application for Letters Patent securing the invention hereinafter described and claimed is a continuation-in-part of applicants' prior copending application, Ser. No. 392,614 filed Aug. 27, 1964 and now abandoned.

This invention relates to androst/estr-4-en-17β-yloxy-trialkylsilanes and congeners, and to processes for the preparation thereof. More particularly this invention provides new, useful, and unobvious chemical compounds of the formula

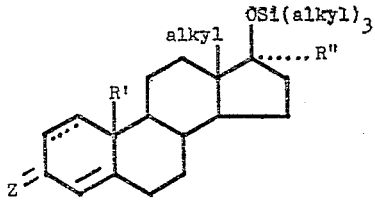

wherein R' and R" each represent hydrogen or an alkyl radical; Z represents hydrogen or oxygen; and the dotted line designates the optional presence of a $\Delta^1$ double bond.

Among the alkyl radicals represented by R' in the foregoing formula, methyl is especially preferred. The other alkyl radicals called for in the formula—which can be the same or different—are desirably lower alkyl radicals, i.e., methyl, ethyl, propyl, isopropyl, butyl, sec-butyl, tert-butyl, pentyl, neopentyl, hexyl, isohexyl, heptyl, or like monovalent, acyclic, saturated, straight- or branched-chain, hydrocarbon groupings of the formula

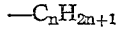

wherein $n$ represents a positive integer less than 8.

The compounds to which this invention relates are characterized by valuable pharmacological properties. Thus, for example, they are anabolic, androgenic, and antibiotic agents, their antibiotic activity being demonstrated by a capacity to inhibit dicotyledenous seed germination and the growth of *Chlorella vulgaris*. Further, they reduce the rate of hydrolysis of hemoglobin by pepsin.

Preparation of the subject compounds proceeds by contacting a steroid of the formula

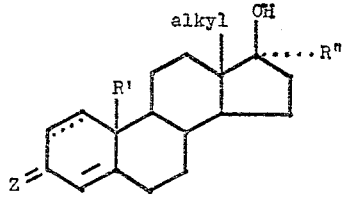

with a chlorosilane of the formula

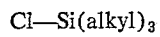

in pyridine solution, R', R", Z, and the dotted line having the meanings previously assigned. Addition to the reaction of the corresponding hexaalkyldisilazane (alkyl)$_3$SiNHSi(alkyl)$_3$ appears to enhance the yield.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotation is referred to the D line of sodium.

EXAMPLE 1

*Androst-4-en-17β-yloxytrimethylsilane.*—To a solution of 20 parts of androst-4-en-17β-ol in 1100 parts of pyridine is added, with vigorous agitation, 169 parts of hexamethyldisilazane, followed by 91 parts of trimethylchlorosilane. Agitation is continued for approximately 1 minute, whereupon the reactants are allowed to stand for 5 additional minutes, then mixed with 11,000 parts of ice water. The oil which separates from the resultant mixture solidifies to a waxy solid on standing. Filtered off, washed on the filter with water, dried in air, and recrystallized from hexane, it melts at 133–135° and is further characterized by a specific rotation of +69° at 25° in chloroform (1%). The product thus isolated is androst-4-en-17β-yloxytrimethylsilane, having the formula

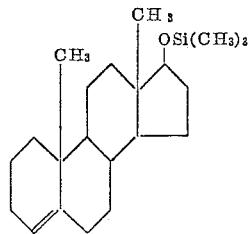

EXAMPLE 2

*Estr-4-en-17β-yloxytrimethylsilane.*—Substitution of 20 parts of estr-4-en-17β-ol for the androst-4-en-17β-ol called for in Example 1 affords, by the procedure there detailed, estr-4-en-17β-yloxytrimethylsilane, having the formula

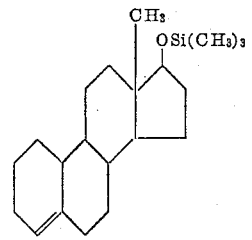

EXAMPLE 3

*3-oxoandrost-4-en-17β-yloxytrimethylsilane.*—To a solution of 2 parts of testosterone in 100 parts of pyridine is added 15 parts of hexamethyldisilazane and 8 parts of trimethylchlorosilane. The reactants are thoroughly mixed and then allowed to stand for 5 minutes, whereupon they are poured into 1 liter of ice water. The granular precipitate thrown down is filtered off, washed with water, dried in air, and recrystallized from hexane to give 3-oxo-androst-4-en-17β-yloxytrimethylsilane melting at approximately 133–134°. The product has the formula

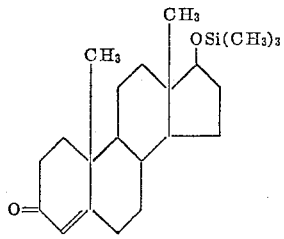

EXAMPLE 4

*3-oxoandrost-4-en - 17β - yloxyethyldimethylsilane.*—To a solution of 20 parts of androst-4-en-17β-ol in 1100 parts of pyridine is added, with vigorous agitation, 102 parts of ethyldimethylchlorosilane. Agitation is continued for approximately 1 minute, whereupon the reactants are allowed to stand for 5 additional minutes, then mixed with 11,000 parts of ice water. The insoluble material thrown down is separated, washed with water, and dried in vacuo. The product thus isolated is 3-oxoandrost-4-en-17β-yloxyethyldimethylsilane, having the formula

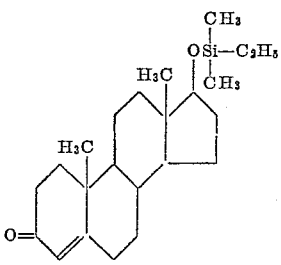

EXAMPLE 5

*3 - oxoandrost - 4 - en - 17β - yloxyethylmethylpropylsilane.*—Substitution of 126 parts of ethylmethylpropylchlorosilane for the ethyldimethylchlorosilane called for in Example 4 affords, by the procedure there detailed, 3-oxoandrost-4-en - 17β - yloxyethylmethylpropylsilane, having the formula

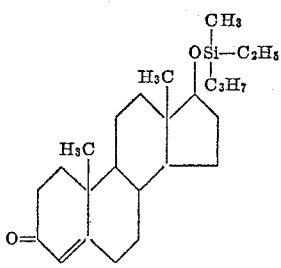

EXAMPLE 6

*17α-methyl-3-oxoandrost - 4 - en-17β - yloxytrimethylsilane.*—To a solution of 1 part of 17β-hydroxy-17α-methylandrost-4-en-3-one in 100 parts of pyridine is added, with vigorous agitation, 8 parts of hexamethyldisilazane, followed by approximately 4 parts of trimethylchlorosilane. Agitation is continued for approximately 1 minute, whereupon the reactants are allowed to stand at room temperatures for 90 minutes, then poured into 600 parts of ice and water. A waxy solid slowly forms. The solid is filtered off, washed on the filter with water, dried in air, and recrystallized from hexane to give 17α-methyl-3-oxoandrost-4-en-17β - yloxytrimethylsilane melting at 104–111°. The product has the formula

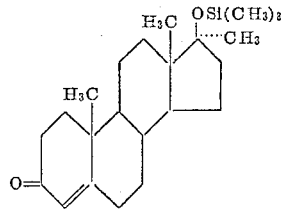

EXAMPLE 7

*3-oxoestr-4-en - 17β - yloxytrimethylsilane.*—Substitution of 2 parts of 17β-hydroxyestr-4-en-3-one for the testosterone called for in Example 3 affords, by the procedure there detailed, 3-oxoestr-4-en-17β-yloxytrimethylsilane melting at 118–120°. The product has the formula

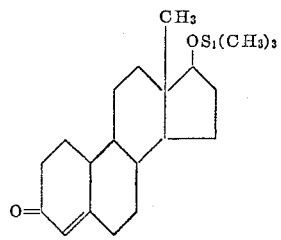

EXAMPLE 8

*17α-ethyl-3-oxoestr-4-en - 17β - yloxytrimethylsilane.*—To a solution of 2 parts of 17α-ethyl-17β-hydroxyestr-4-en-3-one in 200 parts of pyridine is added, with vigorous agitation, approximately 15 parts of hexamethyldisilazane, followed by approximately 9 parts of trimethylchlorosilane. Agitation is continued for approximately 1 minute, whereupon the reactants are allowed to stand at room temperatures for 2 hours, then poured into 1000 parts of ice and water. The oil which separates is extracted with hexane; and the hexane extract is consecutively washed with water and saturated aqueous sodium chloride, dried over anhydrous sodium sulfate, and stripped of solvent by vacuum distillation. The residual oil is 17α-ethyl - 3 - oxoestr - 4 - en-17β-yloxytrimethylsilane, having the formula

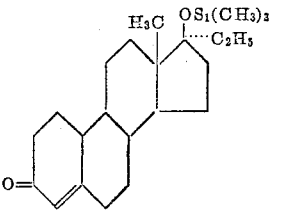

EXAMPLE 9

*3-oxoandrosta - 1,4 - dien-17β-yloxytrimethylsilane.*—To a solution of 5 parts of 17β-hydroxyandrosta-1,4-dien-3-one in 500 parts of pyridine is added, with vigorous agitation, approximately 39 parts of hexamethyldisilazine, followed by approximately 22 parts of trimethylchlorosilane. Agitation is continued for approximately 30 seconds, whereupon the reactants are allowed to stand for 5 additional minutes, then mixed with 2000 parts of ice and water. The oil which separates from the resultant mixture congeals on standing, and is thereupon filtered off, washed on the filter with water, dried in air, and recrystallized from hexane to give 3-oxoandrosta-1,4-dien- 17β-yloxytrimethylsilane melting at 101–104°. The product has the formula

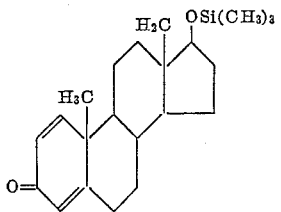

What is claimed is:
1. A compound of the formula

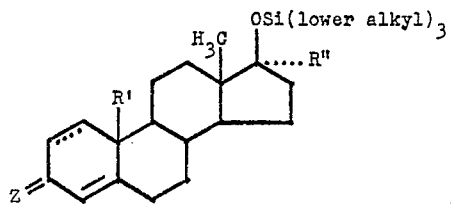

wherein Z is selected from the group consisting of hydrogen and oxygen, R' is selected from the group consisting of hydrogen and the methyl radical, R" is selected from the group consisting of hydrogen and radicals of the formula $$-C_nH_{2n+1}$$

in which $n$ represents a positive integer less than 3, and the dotted line designates an optional double bond.
2. Androst-4-en-17β-yloxytrimethylsilane.
3. Estr-4-en-17β-yloxytrimethylsilane.
4. A compound of the formula

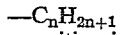

5. 3-oxoandrost-4-en-17β-yloxytrimethylsilane.
6. 17α-methyl-3-oxoandrost-4-en-17β - yloxytrimethylsilane.
7. 3-oxoestr-4-en-17β-yloxytrimethylsilane.
8. 3-oxoandrosta-1,4-dien-17β-yloxytrimethylsilane.

No references cited.

ELBERT L. ROBERTS, *Primary Examiner.*

E. ROBERTS, *Examiner.*